March 12, 1929.  W. A. HORTHY ET AL  1,705,293
TEAT CUP FOR MILKING MACHINES
Filed Nov. 7, 1925

Inventors.
William A. Horthy
and Floyd G. Hodsdon,
By H. P. Dasliab
Atty.

Patented Mar. 12, 1929.

1,705,293

UNITED STATES PATENT OFFICE.

WILLIAM ARNOLD HORTHY AND FLOYD G. HODSDON, OF CHICAGO, ILLINOIS, ASSIGNORS TO INTERNATIONAL HARVESTER COMPANY, OF CHICAGO, ILLINOIS, A CORPORATION OF NEW JERSEY.

TEAT CUP FOR MILKING MACHINES.

Application filed November 7, 1925. Serial No. 67,519.

This invention relates to milking machines and particularly to a teat cup construction for use in such machines of the suction or vacuum type.

It is the main object of the invention to provide such a teat cup, including a pulsating mechanism in its body, which will control the vacuum and in the main be dependent for such controlling action upon the milk flow from the teat, and atmospheric pressure, whereby harmful overmilking is impossible.

A further object is to provide a teat cup comprising a minimum number of parts, so that the same may be cheaply manufactured and may easily be kept clean.

Other objects will be apparent to anyone skilled in this art as the disclosure progresses.

These objects are accomplished, briefly, in a teat cup construction embodying an upper teat chamber and a lower milk chamber, the two chambers being communicable by means of an apertured diaphragm member, but being normally separated by a valve member covering the aperture in the diaphragm. The teat chamber is in communication with atmospheric pressure by means of a pin hole in its wall, and the lower or milk chamber is connected with a source of vacuum. By starting the vacuum, certain forces, later to be described, act to milk the cow by a proper pulsating action.

In the accompanying sheet of drawings—

Figure 1:
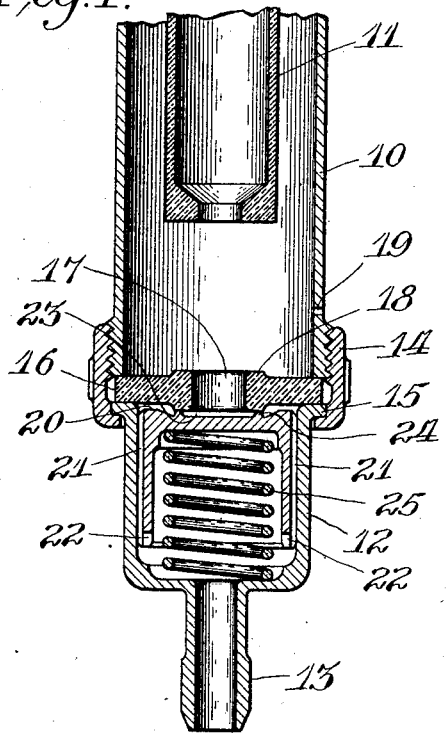
Fig. 1 is a side elevational view of the improved teat cup, the top of the cup being omitted as it is not necessary to this disclosure.
Figure 3:
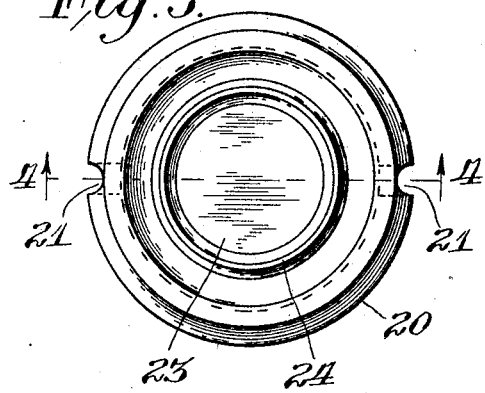
Fig. 3 is a top plan view of the same member.
Figure 4:
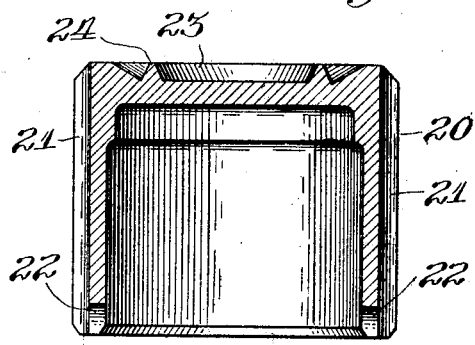
Fig. 4 is a side elevational view of the same member when viewed along line 4—4, as shown in Fig. 3.
Figure 2:
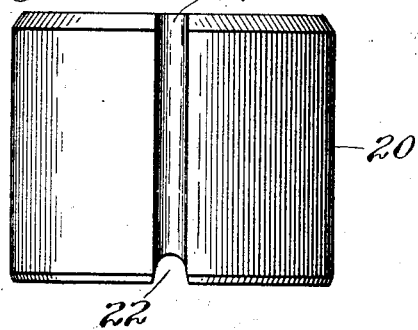
Fig. 2 is a side elevational view of the valve member of the pulsating mechanism housed in the milk chamber.

The improved teat cup comprises a hollow tubular body 10, and therein is supported in any suitable manner a rubber liner 11 for receiving a teat in the usual way. A cup-shaped member 12 having a nipple 13 protruding from its bottom is in communication with any suitable source of vacuum (not shown), the cup 12 being securely connected to the lower end of the body 10 by means of a threaded locking collar 14, as shown. The upper edge of the cup 12 is provided with an outwardly bent flange 15 which is engaged by the collar 14 and upon which rests the circumferential edge of a rubber diaphragm member 16 in such a manner that it is interposed like a gasket between the top edge of the cup 12 and the lower edge of the body 10 and thereby insuring at all times an air tight connection between the upper and lower chambers. The diaphragm is centrally apertured at 17 to form a milk outlet for the body, said diaphragm furthermore being of fairly thick rubber and lying between the body 10 and cup 12 without being stretched. The diaphragm thus, it will be seen, separates the entire teat cup into two chambers, one being an upper, or teat, chamber above the diaphragm, and the other being a lower, or milk, chamber below the diaphragm. It will also be observed that the suction nipple is in line with the aperture 17 in the diaphragm. The diaphragm is also thickened on both sides at its center adjacent the aperture 17, as at 18, so that it is not necessary to exercise care by placing the diaphragm in a certain position as both sides are exactly alike. The upper chamber is in communication with the atmosphere by means of a pin hole 19 through the wall of the body 10.

A valve in the form of an inverted cup-shaped member 20 is arranged in the milk chamber, as shown, it fitting snugly against the inner wall of the piece 12 but being freely slidable, up and down, in the chamber. On diametrically opposed sides this valve 20 is provided with vertical grooves 21 which extend the full length of the valve and at their lower ends run into a cut out 22 through the wall of the valve, as shown. The top side of the valve is dished out, as at 23, and is furthermore provided with a circular, upraised portion 24 of somewhat larger diameter than the diameter of the aperture 17 in the diaphragm. A coil spring 25, of non-corrosive metal, fits inside of the valve and seats at its ends on the inner top face of the valve 20 and the bottom of the cup 12, said spring exerting just enough pressure to seat the top of the valve 20 with its upraised portion 24 against the diaphragm 16 at its thickened portion 18, when the air in the upper and lower chambers is under equal pressure.

The mode of operation of the present improved teat cup will now be described. It is applied to the teat of a cow in such a manner that the liner 11 will surround and engage the teat in the usual way. A hose, not shown, is connected to the nipple 13 and to a source of vacuum, such as a milk can under vacuum. The suction will exhaust the air instantaneously from the lower chamber, or milk chamber as it has been called, and in view of the fact that the upper chamber above the diaphragm is exposed to atmosphere by means of the hole 19, obviously such atmospheric pressure will immediately be operative to push down on the top of the valve 20 through the aperture 17 and move it way from the diaphragm, against the force of the spring 25. With the valve 20 down and away from the diaphragm 16, the vacuum will spread into the upper chamber by traveling through the cut outs 22, the grooves 21, past the portions 24 and 18 and through the diaphragm aperture 17 into the upper chamber. This suction will now expand the liner 11 and milk will flow from the cow's teat. The milk passes over the top of the valve 20, down the grooves 21 and through the cut outs 22 and into the lower chamber around and through the spring 25 and out of the nipple 13 into the milk can (not shown). With the upper chamber thus under vacuum, the valve member is in equilibrium with a vacuum thereabove and therebelow, so that the spring 25 can now exert its force and clamp the valve 20 once more against the diaphragm to close the aperture 17. This vacuum in the upper chamber is decreased gradually by the inflow of air through hole 19 and the milk flow from the teat, until the valve member is no more in equilibrium, when it begins to open slightly allowing the milk and air in a decreasing vacuum to spread over the entire diameter of the valve member faster than it can be drained away through the grooves 20. The valve member is thus forced down quickly. Due to gravity, the milk is drawn off first, but if the flow of milk and air through the grooves 20 is not sufficient to bring the valve member in equilibrium again, the milk will flow from the teat uninterrupted. If the milk flows very freely so that the valve member remains open, the suction is constant as it ought to be, because the milk must be sucked out continuously when the cow gives it freely. These pulsations occur intermittently at the rate of about 60 to 120 per minute while milk flows slowly or not at all from the teat, but when the flow of milk increases and the cow gives it down freely, these pulsations becomes less marked and the valve 20 instead of clicking perceptibly, in effect merely flutters slightly. A cluster of four cups may be left on the cow's udder until all teats are milked, it being well known that all teats do not give milk equally at the same rate or at the same time. With the use of the present teat cup no harm will be done if the teats do not milk alike, as each cup would operate entirely independently of the others and would automatically have its pulsations controlled by the milk flow. With the above teat cup, the cow will be thoroughly and rapidly milked without causing her any injury.

It must be appreciated that the teat cup of this invention is very simple and as it is constructed of a minimum number of parts, that it can be easily and cheaply manufactured and, furthermore, be kept clean and sanitary with a minimum of effort. In cleaning the teat cup, the same is taken apart by turning the threaded collar 14, which may be knurled to facilitate turning, and thus separating the body 10 from the cup 12.

Of course, only the preferred embodiment of the invention has been shown and described, and accordingly, it should be understood that the same is capable of modifications and that it is the intent to include all such modifications which fall within the spirit and scope of this invention as indicated in the following claims.

What we claim as our invention is:

1. In a milking machine teat cup, the combination of a body, a chamber in communication with the body and having a suction connection, a valve for interrupting the communication between the chamber and body, and a spring in the chamber for seating the valve.

2. In a milking machine teat cup, the combination of a body communicating with the atmosphere, a chamber communicating with the body and with a source of vacuum, and a spring pressed valve for intermittently interrupting the communication between the chamber and body.

3. In a milking machine teat cup, the combination of a body having a milk outlet, a chamber communicating with the outlet, a valve in the chamber, and a spring in the chamber engaging the valve whereby the valve may interrupt communication of the chamber with the milk outlet.

4. In a milking machine teat cup, the combination of a body communicating with the atmosphere, a chamber communicating with the body and with a source of vacuum, a cup-shaped valve slidable in the chamber, and a spring for moving the valve to interrupt communication of the chamber with the body.

5. In a teat cup, the combination of a body having a milk outlet therein, a chamber below the outlet and communicating therewith, an inverted hollow cup-shaped valve slidable in the chamber, and means for exerting a force to hold said valve against the milk outlet.

6. In a teat cup, the combination of a body communicating with the atmosphere and having a milk outlet therein, a chamber communicating with the outlet and having a suction connection, a valve slidable in the chamber and provided with passages to direct milk from the body through the chamber to the suction connection, and a spring in the chamber for forcing the valve against the milk outlet to cut off the flow of milk from the body.

7. In a teat cup, the combination of a body communicating with the atmosphere and having a milk outlet therein, a chamber communicating with the outlet and having a suction connection out of its bottom, a valve slidable in the chamber and closely fitting against the chamber wall but provided with passages to direct milk from the body through the chamber to the suction connection, and means in the chamber in line with the suction connection for exerting a force to move the valve against the milk outlet to cut off the flow of milk from the body.

8. In a teat cup, the combination of a body, a cup-shaped member constituting a milk chamber secured to the body, an apertured diaphragm separating the body and chamber, and a slidable spring pressed valve in the chamber for closing the aperture in the diaphragm.

9. In a teat cup, the combination of a body, a cup-shaped member constituting a milk chamber secured to the body, an apertured diaphragm separating the body and chamber, a valve slidable in the chamber and closely fitting the walls of the chamber but provided with milk passageways, a suction connection for the chamber, and means in the chamber in line with the suction connection for exerting a force to seat the valve against the diaphragm to close the aperture.

10. In a teat cup, the combination of a body, a chamber communicating therewith and having a discharge connection, a diaphragm clamped between said elements, said diaphragm having an opening therein, a sliding valve in the chamber contacting the sides of the chamber, said valve being provided with a by-pass, and a spring engaging the valve to seat the same against the diaphragm opening to interrupt communication between the chamber and body.

11. In a teat cup, the combination of a body, a chamber communicating therewith and having a discharge connection, a diaphragm clamped between said elements, said diaphragm having an opening therein, a sliding valve in the chamber contacting the sides of the chamber, said valve being being provided with a plurality of by-passes, and a spring engaging the valve adjacent its periphery to seat the same against the diaphragm opening to interrupt communication between the chamber and body.

12. In a teat cup, the combination of a body communicating with the atmosphere, a chamber connected to the body and having a discharge connection, a diaphragm clamped between said elements, said diaphragm having an opening therein to permit communication between the body and chamber, a valve slidable in the chamber, said valve contacting the chamber wall and provided with a by-pass, and a spring in the chamber for moving the valve to seat it against the diaphragm.

In testimony whereof we affix our signatures.

WILLIAM ARNOLD HORTHY.
FLOYD G. HODSDON.